Patented May 15, 1951

2,552,925

UNITED STATES PATENT OFFICE 2,552,925

STABILIZED PEANUT BUTTER

Fitzhugh L. Avera, Alameda, Calif., assignor to Rosefield Packing Co. Ltd., Alameda, Calif., a corporation of California No Drawing. Application March 11, 1949, Serial No. 81,021

15 Claims. (Cl. 99—128)

The invention, in general, relates to the production of stabilized peanut butter, and more particularly relates to an improved soft and easily spreadable stabilized peanut butter having increased palatability and flavor.

Heretofore, in this art, considerable attention has been devoted to the provision of stabilized peanut butters which are free from rancidity for appreciable periods of time, and which are non-sticky and non-waxy. Many of the stabilized peanut butters heretofore marketed, however, have been found to harden under the variable temperature conditions at which they become confluent solids or semi-solids and, in addition to rendering the product unpalatable and deficient in natural peanut flavor accessibility, such products in their congealed state contract readily and present highly undesirable appearances to prospective customers in that the congealed or hardened mass pulls away from the walls of the containers. The present invention is directed to obviating all of the inherent disadvantageous features of prior stabilized peanut butters while retaining the advances made as to increased freedom from rancidity and freedom from oil separation, as well as to provide a product having optimum peanut flavor and increased plasticity.

A primary object of my invention is to provide an improved stabilized peanut butter containing a multiplicity of intra-congealed solid or semi-solid disassociated units which do not inter-congeal to continuity at temperatures below the congealing point of such disassociated units.

Another object of the present invention is to provide an improved stabilized peanut butter of the indicated nature which is additionally characterized by its thixotropic-like quasi-fluidity and softness at temperatures below the congealing point of each of a multiplicity of intrinsically confluent but disassociated units thereby affording increased spreadability of the aggregate product.

A still further object of the invention is to provide an improved stabilized peanut butter of the aforementioned character which can be produced by conventional equipment normally used in the manufacture of stabilized peanut butter generally, plus special equipment to achieve the deliberately disassociated intra-congealed units of my stabilized peanut butter at a temperature below its congealing point wherein the aggregate of the produced units remains non-confluent.

Other objects of the invention, together with some of the advantageous features thereof, will appear from the following description of a preferred embodiment thereof. It is to be understood, however, that I am not to be limited to the precise embodiment herein described nor to the precise modes of manufacture hereinafter set forth, as my invention, as defined in the appended claims can be embodied in a plurality and variety of forms.

In accordance with my present invention, my improved stabilized peanut butter preferably is produced by initially following the usual steps of preparing a comminuted mass of peanut butter and added stabilizer to a stage wherein the majority of the fat constituents and stabilizer are free liquids. Thereafter, by the application of heat exchange, I remove sufficient calories to bring the stabilizer present in the butter to a temperature range of crystal formulation. Then, by agitation or repetitive distortion or other physical means applied to the mass during the major release of the heat of crystallization, with sufficient physical activity and distortion to restrict the confluent crystalline formation en masse, I cause the production of a plurality of discrete crystalline contituents or units rather than a single confluent congealed crystallized aggregate or a series of confluent aggregates of large enough size to produce product rigidity. It is essential that agitation, distortion or disruption be continued until a temperature equilibrium has been reached which inhibits the inter-welding or inter-congealing of the plurality of solid or semi-solid crystalline units as well as prevents the further major crystalline growth.

I have successfully produced my stabilized peanut butter by first reducing the normal manufacturing temperatures during the comminution of the peanut butter solids to below approximately 80° F., and then adding a peanut butter stabilizer at a temperature just above its melting point. Thereafter, agitation, distortion or disruption was carried on until a temperature equilibrium of the aggregate mass was reached; the agitation, distortion or disruption promoting the growth of a plurality of discrete crystalline units each of which is intrinsically confluent but the aggregate of which is non-confluent in contradistinction to a continuous crystalline matrix throughout the product. The added stabilizer preferably employed in the production of my improved stabilized peanut butter is hydrogenated edible oil, such as peanut oil, and can constitute the whole, or a part, or an addition to the natural peanut oil normally present in peanuts. I have also found that a non-oleaginous stabilizer can be employed with effective results, such as an edible alcohol as exemplified by the higher alcohols which are solid at normal ambient temperatures.

Some representative alternate methods of manufacturing my improved stabilized peanut butter are as follows:

One preferred method comprises first reducing the temperature of a peanut butter that has been stabilized by the introduction of a melted stabilizer, or the introduction of a stabilizer with subsequent melting thereof, into a comminuted mass of peanuts by removing all or part of the heat generated by grinding and other production steps presently carried out in the production of stabilized peanut butter, until the aggregate mass has reached a temperature at which the oleaginous stabilizer present reaches the form of a relatively continuous and solidified confluent matrix. Thereafter, mechanical mixing, distortion or disruptive working of the relatively solidified mass is carried on under conditions which absorb the kinetic heat generated by such mechanical working so as to prevent the mechanically produced heat from causing the inter-welding or inter-congealing of the discrete crystalline units produced by the comminution, distortion or disruptive agitation. It is to be understood that by distortion or disruptive agitation, I mean that the mass is subjected to either extrusion, screening, mechanical subdivision, slicing, cutting, milling, stirring, or the application of any disruptive forces, including sonic, supersonic or other vibrations, or a combination thereof.

The foregoing method includes the step of cooling a comminuted mass of peanuts from the temperature incident to the methods of manufacturing stabilized peanut butter as disclosed in the prior art, through the temperature point at which the major heat of crystallization is reached; during which time the cooling mass is rapidly agitated, distorted, disrupted or mixed in order to form a plurality of discrete units or seed crystalline units rather than a congealed large and confluent crystalline mass. I have found, for example, that for one rate of heat exchange the period of cooling for attaining optimum results is about seven minutes. It is to be further observed that the minimum temperature required during the mixing or agitation step will depend upon the welding or inter-congealing characteristics of the newly formed discrete units or seed crystalline units, as well as the nature and action of solids and product constituents present which act as coating materials to inhibit further crystalline growth and deter inter-congealing of the deliberately disassociated intra-congealed units. I have also found that a temperature end-point ranging between approximately 80° F. and approximately 65° F. is eminently satisfactory during the agitation of the mass before the first major heat of crystallization becomes evident when following my preferred method and using hydrogenized peanut oil as the stabilizer.

Another method of production comprises melting the oleaginous, or other stabilizer employed, and cooling the same to just above its congealing point, and thereafter adding such prepared stabilizer to a general mass of comminuted peanuts the temperature of which previously has been tempered to approximately 80° F. or to a temperature that will prevent the stabilizer raising the overall temperature of the combined product to that point at which the deliberately disassociated intra-congealed units or discrete crystalline units will inter-weld or inter-congeal during their formulation under agitation, distortion or disruption.

It is known among those skilled in the prior art of manufacturing stabilized peanut butter that certain stabilizers can be used without the addition of melting heat for the dispersion of said stabilizers throughout the mass of roasted and comminuted peanuts, but that subsequent melting heat is required to produce a congealed and relatively continuous stabilizing matrix throughout the product to prevent oil separation and, furthermore, when stabilized peanut butter reaches a temperature below which it is relatively congealed and confluent it presents certain undesirably reduced softness, reduced spreadability and reduced flavor accessibility. Accordingly, a third method of manufacturing my improved stabilized peanut butter can be followed in which the described effects of the prior art are diminished. This third method includes the aforementioned addition of the stabilizer without pre-melting and with added or generated heat leading to subsequent stabilizing matrix formation, whereafter, repetitious agitation, disruption or distortion is then instituted during or after congealment of the stabilizer, forming intra-congealed, deliberately disassociated units each of which is intrinsically confluent but the aggregate of which is non-confluent.

A fourth method comprises the deliberate disassociation of the stabilizer, per se, or stabilizer and liquid peanut constituents while in an isolated state; said disassociation being achieved by agitation, disruption or distortion of the materials at a temperature below the stabilizer congealing point to produce a plurality of intra-congealed units the extrinsic aggregate of which prevents greater quasi-fluidity softness and spreadability than is intrinsic to each of said intra-congealed, diassociated units; and thereafter admixing comminuted peanuts with such prepared units.

It is also to be noted that homogeneous inter-unit mutual solubilities or dispersibilities of the combined stabilizer and normal liquid peanut oils are inhibited by the mechanically enhanced institution of a plurality of seed crystals or product units which units are allowed to reach optimal size thought to be less than approximately 200 mesh; such optimal size of the deliberately disassociated crystalline units or discrete product units being prevented from inter-welding or inter-congealing as a result of the reduction of temperature below the intra-congealing point of each of said units. Moreover, when each intrinsically confluent constituent product unit has intra-congealed at an equilibrium temperature below said intra-congealing point, the extrinsic aggregate of the plurality of such units thereafter remains disassociated at temperatures below said intra-congealing point.

Summarizing the foregoing, it is to be noted that my improved product of comminuted peanuts and stabilizer contains a plurality of deliberately disassociated units each of which is confluent and gravitationally stable, while the extrinsic aggregate of such units affords greater softness and spreadability of the product than is intrinsic to each such intra-congealed unit; due to the deliberately retained unit disassociation. It is to be emphasized that my improved stabilized peanut butter attains and retains, at lower temperatures than heretofore possible, a thixotropic-like quasi-fluidity and softness with increased peanut butter flavor accessibility and enhanced spreadability characteristics. The deliberately disassociated crystalline units or discrete product units present in my improved product do not continue to increase in size and thus negate the improvement afforded over the prior art, nor is the improvement lost through inter-welding or inter-congealing, because of the inhibiting action of ambient temperatures below the intra-congealing point and other inhibiting factors such as solids and liquids present in the total product which act to coat the crystalline units.

It is to be understood that the appended claims are to be accorded a range of equivalents commensurate in scope with the advance made over the prior art.

I claim:

1. A stabilized peanut butter comprising a plurality of solid deliberately disassociated units; the aggregate of said plurality of disassociated units presenting quasi-fluidity, softness and spreadability at temperatures below the congealing point of each of the said disassociated units.

2. A peanut butter comprising a plurality of solid deliberately disassociated units each including a stabilizer; the aggregate of said plurality of disassociated units presenting quasi-fluidity, softness and spreadability at temperatures below the congealing point of said stabilizer in each of said disassociated units.

3. A peanut butter as defined in claim 2 wherein each of said solid disassociated units comprises liquid phases of comminuted peanuts dispersed in said stabilizer.

4. A peanut butter as defined in claim 2 wherein each of said solid disassociated units comprises comminuted peanuts dispersed in said stabilizer.

5. A stabilized peanut butter comprising a plurality of disassociated units dispersed in the liquid phase of comminuted peanuts and bonded to said liquid phase by residual affinity; the aggregate of said plurality of disassociated units presenting quasi-fluidity, softness and spreadability at temperatures below the congealing point of each of said units.

6. A peanut butter containing a stabilizer, said peanut butter comprising a plurality of disassociated units each of which is intrinsically gravitationally stable; the extrinsic aggregate of said plurality of disassociated units presenting quasi-fluidity, softness and spreadability at temperatures below the congealing point of said stabilizer, said stabilizer having a melting point higher than the normal melting point of the predominant liquid phase of roasted and comminuted peanuts.

7. A peanut butter as defined in claim 6 wherein said stabilizer is oleaginous.

8. A stabilized peanut butter comprising a plurality of semi-solid disassociated units, each of which is intrinsically confluent; the extrinsic non-confluent aggregate of said plurality of semi-solid disassociated units at temperatures below the congealing point of each of said disassociated units presenting greater quasi-fluidity, softness and spreadability than intrinsically exists within each of said units.

9. A peanut butter comprising a plurality of semi-solid discrete units each including a stabilizer; the aggregate of said plurality of discrete units at temperatures below the congealing point of said stabilizer in each of said discrete units presenting greater quasi-fluidity, softness and spreadibility than intrinsically exists within individual discrete units.

10. A peanut butter as defined in claim 9 wherein each of said semi-solid discrete units comprises liquid phases of comminuted peanuts dispersed in said stabilizer.

11. A peanut butter as defined in claim 9 wherein each of said semi-solid discrete units comprises comminuted peanuts dispersed in said stabilizer.

12. A stabilized peanut butter of the enhanced aggregate quasi-fluidity, softness and spreadability above that intrinsically existing with each of a plurality of deliberately disassociated units constituting the stabilized peanut butter.

13. A stabilized peanut butter comprising a mass of solid, deliberately disassociated units which present as a total mass quasi-fluidity, softness and spreadability, said total mass having a congealing point lower than the congealing point of each disassociated unit.

14. A peanut butter comprising a mass of disassociated discrete units of peanut butter and a stabilizer, the total mass presenting quasi-fluidity, softness and spreadability and the congealing point of the total mass being lower than the congealing point of each discrete unit, as well as the stabilizer.

15. A stabilized peanut butter comprising a mass of disassociated, discrete units of peanut butter dispersed in a liquid peanut butter stabilizer, the total mass presenting quasi-fluidity, softness and spreadability and the congealing point of the total mass being lower than the congealing point of each discrete unit as well as of the stabilizer.

FITZHUGH L. AVERA.

REFERENCES CITED

The following references are of record in the file of this patent:

UNITED STATES PATENTS

| Number | Name | Date |
| --- | --- | --- |
| 1,395,934 | Stockton | Nov. 1, 1921 |
| 1,921,275 | Werner | Aug. 8, 1933 |
| 2,447,387 | Avera et al. | Aug. 17, 1948 |